US009025270B1

(12) United States Patent
Nowell et al.

(10) Patent No.: US 9,025,270 B1
(45) Date of Patent: May 5, 2015

(54) ELECTRONIC SYSTEM WITH CURRENT CONSERVATION MECHANISM AND METHOD OF OPERATION THEREOF

(71) Applicant: Western Digital Technologies, Inc., Irvine, CA (US)

(72) Inventors: Shane G. Nowell, Longmont, CO (US); Wayne H. Vinson, Longmont, CO (US); Danny J. Kastler, Longmont, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/188,381

(22) Filed: Feb. 24, 2014

Related U.S. Application Data

(60) Provisional application No. 61/878,963, filed on Sep. 17, 2013.

(51) Int. Cl.
*G11B 21/04* (2006.01)
*G11B 15/46* (2006.01)
*G11B 5/596* (2006.01)
*G11B 19/28* (2006.01)

(52) U.S. Cl.
CPC ...................................... *G11B 19/28* (2013.01)

(58) Field of Classification Search
None
See application file for complete search history.

(56) References Cited

U.S. PATENT DOCUMENTS

| | | | |
|---|---|---|---|
| 5,157,560 A * | 10/1992 | Kanda et al. | 360/69 |
| 5,381,279 A * | 1/1995 | Dunn | 360/70 |
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,272,694 B1 | 8/2001 | Weaver et al. | |
| 6,278,568 B1 | 8/2001 | Cloke et al. | |
| 6,279,089 B1 | 8/2001 | Schibilla et al. | |
| 6,282,046 B1 * | 8/2001 | Houston et al. | 360/73.03 |
| 6,289,484 B1 | 9/2001 | Rothberg et al. | |
| 6,292,912 B1 | 9/2001 | Cloke et al. | |
| 6,310,740 B1 | 10/2001 | Dunbar et al. | |
| 6,317,850 B1 | 11/2001 | Rothberg | |

(Continued)

*Primary Examiner* — Andrew L Sniezek

(57) ABSTRACT

An apparatus includes: a media motor; a media mounted on the media motor; a head, over the media, the motion of the head controlled by a head actuation motor; a motor driver, coupled to the media motor, configured to adjust a media speed; and control circuitry configured to: coast the media motor in preparation for accelerating the head, and activate the head actuation motor including accelerating the head in a first direction for repositioning the head over the media.

22 Claims, 4 Drawing Sheets

(56) References Cited

U.S. PATENT DOCUMENTS

| | | |
|---|---|---|
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,967,811 B1 | 11/2005 | Codilian et al. |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |

(56) References Cited

U.S. PATENT DOCUMENTS

| | | |
|---|---|---|
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,110,214 B1 | 9/2006 | Tu et al. |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,199,966 B1 | 4/2007 | Tu et al. |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,309,967 B2 * | 12/2007 | Moser et al. .................. 318/376 |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,072,704 B1 | 12/2011 | Goldberg et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |

(56) References Cited

U.S. PATENT DOCUMENTS

| | | |
|---|---|---|
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Pruett et al. |
| 8,756,382 B1 | 6/2014 | Carlson et al. |
| 8,769,593 B1 | 7/2014 | Elliott et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton et al. |
| 8,799,977 B1 | 8/2014 | Kapner, III et al. |
| 2009/0113702 A1 | 5/2009 | Hogg |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2014/0201424 A1 | 7/2014 | Chen et al. |

* cited by examiner

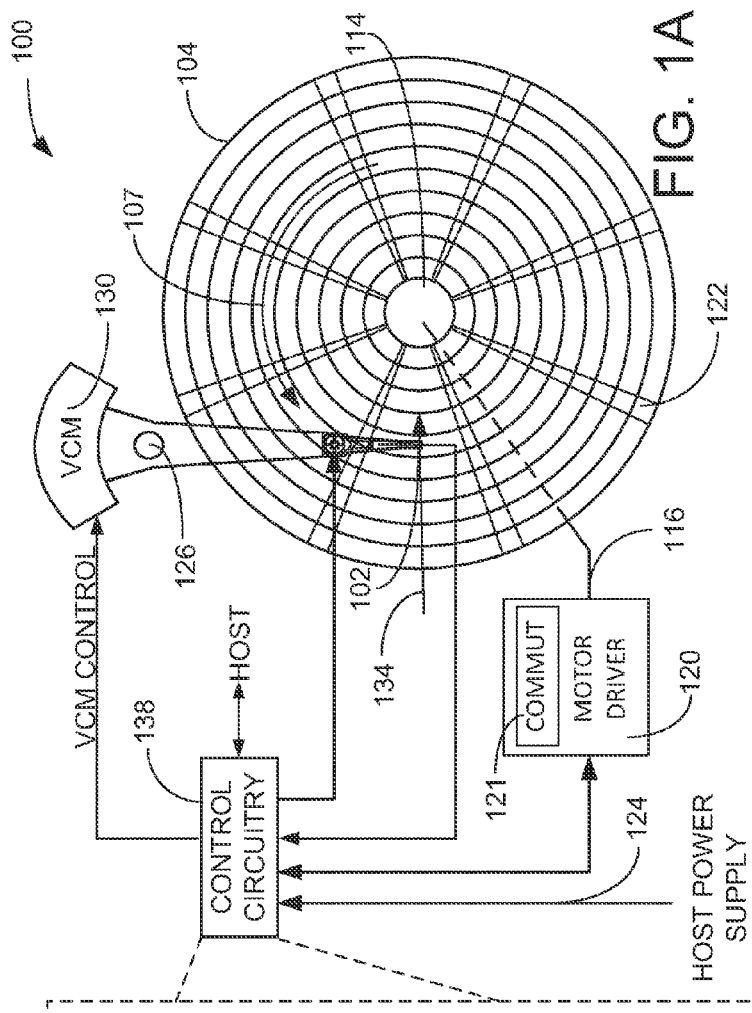
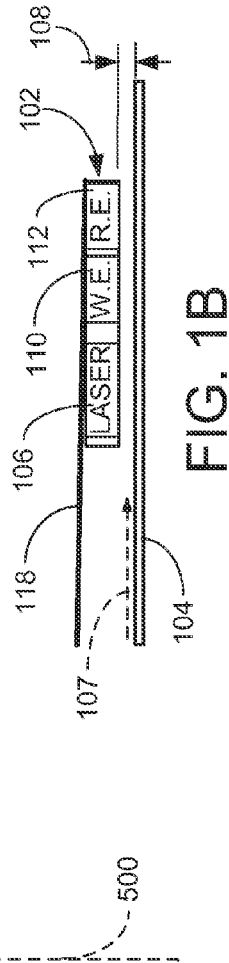
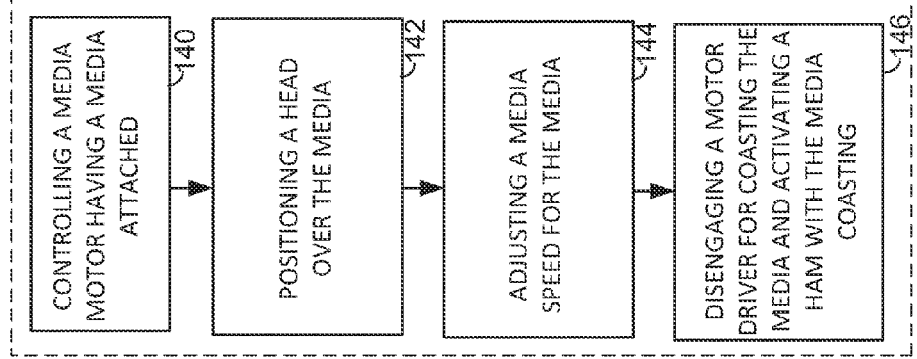
FIG. 1A
FIG. 1B
FIG. 1C

ELECTRONIC SYSTEM WITH CURRENT CONSERVATION MECHANISM AND METHOD OF OPERATION THEREOF

CROSS-REFERENCE TO RELATED APPLICATION

This application claims the benefit of U.S. Provisional Patent Application Ser. No. 61/878,963 filed Sep. 17, 2013, and the subject matter thereof is incorporated herein by reference thereto.

TECHNICAL FIELD

An embodiment relates generally to an electronic system, and more particularly to a system for reducing peak current load of the electronic system.

BACKGROUND

Modern consumer and industrial electronic devices require storage of information, such as digital photographs, videos, electronic mail, calendar, or contacts. These devices can be electronic systems, such as notebook computers, desktop computers, servers, televisions, and digital video recorders, and are providing increasing levels of functionality to support modern life. Research and development in the existing technologies can take a myriad of different directions.

As the volume of data stored in these electronic devices increases, hard disk drives (HDD) must have more data tracks and higher data frequencies must be accommodated. The increase in data capacity, more tracks, and faster interface protocols have driven a constant increase in peak current load. In order to meet the demand of extended battery life in notebook computers, extraordinary measures must be taken to limit the current drawn by the hard disk drive.

The demands of high capacity storage in battery operated environments can impose conflicting requirements on the electronic devices. The demand for higher performance, extended battery life, lower cost, and shrinking size can spawn complex product decisions that attempt to provide a balanced compromise. When the parameters of size, interface type, and capacity are fixed at a design point, there are few compromises that can reduce current demand and maintain device performance.

BRIEF DESCRIPTION OF THE DRAWINGS

FIGS. 1A, 1B, and 1C shows an operational diagram of an electronic system according to an embodiment.

DETAILED DESCRIPTION

Figure 2:
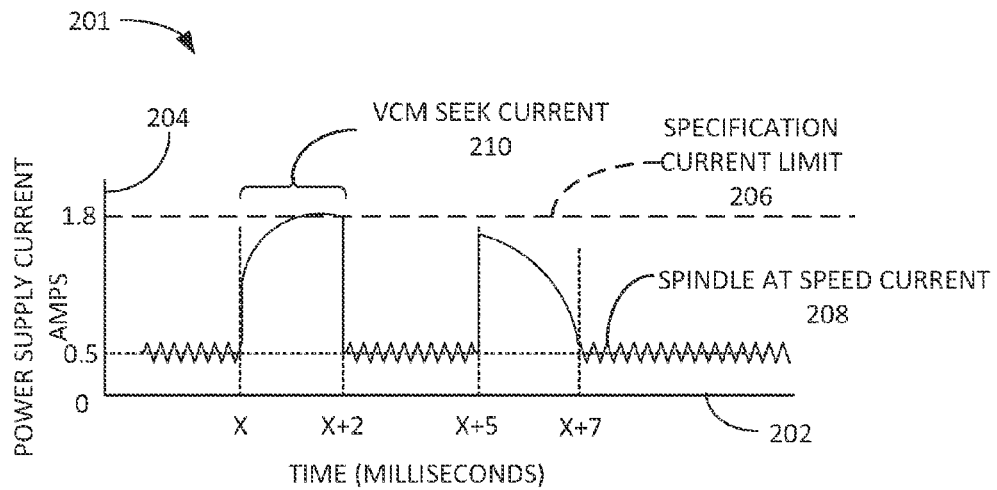
FIG. 2 is a line graph of the power supply current of a prior art disk drive in a head repositioning operation.

A need still remains for an electronic system with current conservation mechanism for improving utilization of supply current while maintaining data performance. The improved utilization of supply current can be provided by a reduction in peak current amplitude without compromising system performance. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

Certain embodiments have other steps or elements in addition to or in place of those mentioned above. The steps or elements will become apparent to those skilled in the art from a reading of the following detailed description when taken with reference to the accompanying drawings.

The following embodiments are described in sufficient detail to enable those skilled in the art to make and use the embodiments. It is to be understood that other embodiments would be evident based on the present disclosure, and that system, process, or mechanical changes may be made without departing from the scope of an embodiment.

In the following description, numerous specific details are given to provide a thorough understanding of the embodiments. However, it will be apparent that the embodiments can be practiced without these specific details. In order to avoid obscuring an embodiment, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, an embodiment can be operated in any orientation. The embodiments have been numbered first embodiment, second embodiment, etc. as a matter of descriptive convenience and are not intended to have any other significance or provide limitations for an embodiment. For reference purposes the data surface of the media is defined as being "horizontal" though it is understood that the electronic system can operate at any angle. Position of the head over the media is referred to as a "vertical" displacement or flying height.

Referring now to FIGS. 1A, 1B, and 1C, therein are shown an operational diagram of an electronic system 100 according to an embodiment. The electronic system 100 can represent an apparatus for one of the embodiments. An embodiment depicted in FIGS. 1A-1C are shown as a hard disk drive, as an example, although it is understood that the electronic system 100 as the embodiment can be a tape drive, a solid-state hybrid disk drive, or other magnetic media-based storage device. Further for example, the electronic system 100 can represent a desktop computer, a notebook computer, a server, a tablet, a television, a household appliance, or other electronic systems utilizing magnetic media storage.

The electronic system 100 including a head 102 actuated over a media 104. The head 102 can be mounted to a flex arm 118. The head 102 (FIG. 1B) can optionally include a laser 106 for heating the media 104 during part of a write process (e.g., the head is part of an Energy-Assisted Magnetic Recording (EAMR) drive). The flying height 108 can be adjusted (e.g., by use of a heater element in the head not shown in FIG. 1B) while writing data to the media 104 or as an error recovery process during reading from the media 104. Also in an embodiment of FIG. 1B, the head 102 comprises a write element 110 (e.g., an inductive coil) and a read element 112 (e.g., a magnetoresistive read element).

The media 104 is a structure for storing information. For example, the media 104 can be made of an aluminum alloy, ceramic/glass, or a similar non-magnetic material. The top and bottom surfaces of the media 104 can be covered with magnetic material deposited on one or both sides of the media 104 to form a coating layer capable of magnetization.

Any suitable version of the laser 106 can be employed in the embodiments, such as a laser diode. In addition, embodiments can employ any suitable techniques for focusing the laser on the media 104, such as a suitable waveguide, magnifying lens, or other suitable optics. The laser 106 is increased to a write power in order to heat the disk, thereby decreasing the coercivity of the media 104 so that the data is written more reliably.

A media motor 114 can rotate the media 104, about a center of the media 104, at constant or varying media speed 107. For illustrative purposes, the media motor 114 is described as a motor for a rotation, although it is understood that the media motor 114 can be other media transport motors for a tape drive, as an example.

The media motor 114 can be controlled by a motor driver current 116, such as a three phase driver current, sourced from a motor driver 120. The motor driver 120 can sequence the motor driver current 116 based on a commutation logic 121. The commutation logic 121 can monitor an unused phase of the motor driver current 116 in order to source current to the media motor 114 or harvest current from the rotating mass of the media motor 114, while coasting with one or more of the media 104 attached.

The commutation logic 121 can control the timing of the application of the motor driver current 116 while controlling the media speed 107 of the media 104. The switching of the commutation logic 121 can place a cyclical demand for power from the power supply current 124 sourced from the host power supply (not shown). A head actuation motor 130 can be used to position the head 102 over the media 104. The head actuation motor 130 generally requires a significant portion of the power supply current 124 when changing the position of the head 102.

As examples, the head actuation motor 130 can be a voice coil motor assembly, a stepper motor assembly, or a combination thereof. The head actuation motor 130 can generate a torque for positioning the head 102 relative to the media 104 by applying a current demand from the power supply current 124.

A tapered end of the flex arm 118 can include the head 102. The flex arm 118 can be mounted to the head actuation motor 130, which is pivoted around a bearing assembly 126 by the torque generated by the head actuation motor 130. The head 102 can include a single instance of the write element 110 and a single instance of the read element 112 that is narrower than the write element 110. The head 102 can fly over the media 104 at a dynamically adjustable span of the flying height 108, which represents a vertical displacement between the head 102 and the media 104. The head 102 can be positioned by the flex arm 118 and the head actuation motor 130 and can have the flying height 108 adjusted by control circuitry 138.

The head 102 can be positioned over the media 104 along an arc shaped path between an inner diameter of the media 104 and outer diameter of the media 104. For illustrative purposes, the head actuation motor 130 is configured for rotary movement of the head 102. The head actuation motor 130 can be configured to have a different movement. For example, the head actuation motor 130 could be configured to have a linear movement resulting in the head 102 traveling along a radius of the media 104 in a first direction 134 or opposite the first direction 134.

The head 102 can be positioned over the media 104 to create magnetic transitions or detect magnetic transitions from the coating layer that can be used to representing written data or read data, respectively. The position of the head 102 and the media speed 107 of the media 104 can be controlled by the control circuitry 138. Examples of the control circuitry 138 can include a processor, an application specific integrated circuit (ASIC) an embedded processor, a microprocessor, a hardware control logic, a hardware finite state machine (FSM), a digital signal processor (DSP), digital circuitry, analog circuitry, optical circuitry, or a combination thereof. The control circuitry 138 can also include memory devices, such as a volatile memory, a nonvolatile memory, or a combination thereof. For example, the nonvolatile storage can be nonvolatile random access memory (NVRAM) or Flash memory and a volatile storage can be static random access memory (SRAM) or dynamic random access memory (DRAM).

The control circuitry 138 can be configured to control the media motor 114 for adjusting the media speed 107 of the media 104. A plurality of servo sectors 122 dispersed around the media 104 to form radial spokes. The control circuitry 138 can monitor the frequency of occurrence of the servo sectors 122, in order to determine the rotation rate of the media 104, to calculate the media speed 107. The combination of the demand for current from the media motor 114 and the head actuation motor 130 can cause a peak current that exceeds the specification for the power supply current 124.

The control circuitry 138 can be configured to cause the head 102 to move relative to the media 104, or vice versa. The control circuitry 138 can also be configured to manage the instantaneous demand for power from the system power supply 124. In an embodiment of the invention, the control circuitry 138 can switch off the current to the motor driver 120. The mass of the media 104 spinning will allow the media motor 114 to coast substantially at or near the media speed 107 for a period of time. The coasting of the media motor 114 is due to the inertia of the media 104 spinning freely when the media motor 114 is not driven with full power by the motor controller 120. The control circuitry 138 can take advantage of the coasting of the media motor 114 to reduce a peak demand on the power supply current 124 by providing the media motor 114 less than full power, for example half power, one quarter power, or no power. Some embodiments can harvest current from the coasting of the media motor 114 in order to further reduce the peak demand on the power supply current 124.

In one embodiment, the electronic system 100 further comprises control circuitry 138 configured to execute the flow diagram of FIG. 1C of a method 500 of operation of an electronic system 100 in an embodiment. The method 500 includes: controlling a media motor having a media attached in a block 140; positioning a head over a media in a block 142; adjusting a media speed for the media in a block 144; and disengaging a motor driver for coasting the media, and activating a head actuation motor, with the media coasting, for accelerating the head in a first direction including repositioning the head over the media in a block 146. Additional details related to the flow diagram will be provided below in conjunction with FIGS. 2-5.

Referring now to FIG. 2, therein is shown a line graph 201 of the power supply current of a prior art disk drive in a head repositioning operation. The line graph of the power supply current depicts a horizontal time scale 202 measured in milliseconds and a vertical amperage scale 204 measured in amperes. The composite of the current represented by the vertical amperage scale 204 can have a specification current limit 206. The specification current limit 206 can represent the maximum amount of current that has been allocated by the system power supply 124 of FIG. 1A for operation of the prior art disk drive (not shown). By way of an example the specification current limit 206 can be 1.8 amperes.

A spindle at speed current 208 can represent the motor drive current 116 of FIG. 1A from the media motor 114 of FIG. 1A. By way of an example, the average of the spindle at speed current 208 can be 0.5 amperes. A voice coil motor (VCM) seek current 210 can present a rapid increase in current demand, above the spindle at speed current 208, that can reach or exceed the specification current limit 206. This condition can lead to long term system reliability problems and performance degradation.

By way of an example, the profile of the VCM seek current 210 is shown having a peak demand of 1.3 amperes above the spindle at speed current 210. It is understood that different amounts of current demand can be required for the VCM seek current 210. An acceleration curve represented by the time between X and X+2 on the horizontal time scale 202. The VCM seek current in this time segment can represent accelerating the head 102 of FIG. 1A for performing a seek to a different one of the data tracks on the media 104.

Also by way of an example, the VCM seek current 210 between the times X+5 and X+7 can represent the deceleration of the head 102 for stopping over a target data track on the media 104. It is understood that the deceleration of the head can consume a different amount of the current than the acceleration portion of the seek. During these movements of the head 102, the spindle at speed current will remain relatively constant with, for example, the average at 0.5 amperes. It is understood that the shape and peak of the acceleration curve can be different based on the length of the seek and the speed of the movement. In all cases the current demand of the VCM seek current 210 and the spindle at speed current 208 are additive and can exceed the specification current limit 206.

Figure 3:
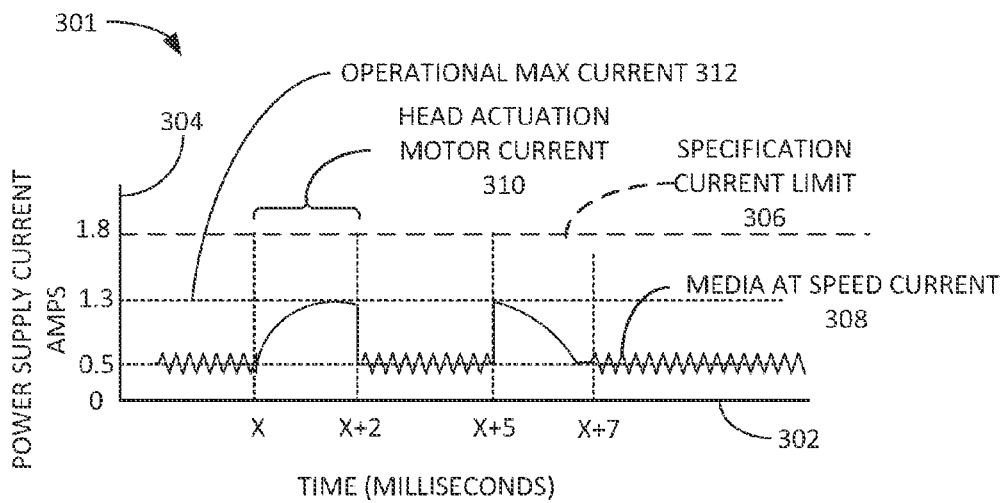
FIG. 3 is a line graph of the power supply current of the electronic system according to one embodiment in a head repositioning operation.

Referring now to FIG. 3, therein is shown a line graph 301 of the power supply current 124 of FIG. 1A of the electronic system 100, according to one embodiment, in a repositioning operation of the head 102 of FIG. 1A. The line graph 301 depicts a horizontal time scale 302 measured in milliseconds and a vertical amperage scale 304 measured in amperes. The composite of the current represented by the vertical amperage scale 304 can have a specification current limit 306. The specification current limit 306 can represent the maximum amount of current that has been allocated by the system power supply 124 of FIG. 1A for operation of the electronic system 100 of FIG. 1A. By way of an example the specification current limit 306 can be 1.8 amperes.

A media at speed current 308 can represent the motor drive current 116 of FIG. 1A from the media motor 114 of FIG. 1A when the media 104 of FIG. 1A is at a constant velocity. By way of an example, the average of the motor drive current 116 can be 0.5 amperes. A head actuation motor (HAM) seek current 310 can present a rapid increase in current demand, above the media at speed current 308, that can reach an operational maximum current 312 that remains well below the specification current limit 306. The media speed current 308 differs from the spindle at speed current 208 of FIG. 2 in that the media speed current 308 can be substantially reduced or switched off during repositioning activities of the head 102 in the electronic system 100, while the spindle at speed current 208, of the prior art system, maintains a constant average current through all operations. Likewise, the HAM seek current 310 differs, from the VCM seek current 210, by being coordinated by the control logic 138 of FIG. 1A to only be asserted when the media at speed current 308 has been reduced or switched off.

By way of an example, the profile of the HAM seek current 310 is shown having a peak demand of 1.3 amperes. It is understood that different amounts of current demand can be required for the HAM seek current 310. An acceleration curve can be represented by the time between X and X+2 on the horizontal time scale 302. The HAM seek current 310 in this time segment can represent accelerating the head 102 of FIG. 1A for performing a seek to a different one of the data tracks on the media 104. The acceleration curve represented by the time between X and X+2 is an example and the actual time for the acceleration curve can be different.

The operational maximum current 312 can be achieved by reducing or eliminating the media at speed current 308 during the application of the HAM seek current 310. The media 104 can maintain sufficient inertia to stay within the operational speed range required by the control circuitry 138 of FIG. 1A to read position information from the servo sectors 122 of FIG. 1A. By reducing or eliminating the media at speed current 308 during the time between X and X+2 on the horizontal time scale 302, the full current demand of the HAM seek current 310 sets the operational maximum current 312, which provides additional operating margin.

It is understood that the HAM seek current 310 can be reduced to substantially zero when the head 102 is at a constant velocity and the HAM seek current 310 represents the acceleration and deceleration of the head 102. The media at speed current 308, representing the motor drive current 116 for the media motor 114, can be reduced between the X and X+2, and the X+5 and X+7 on the horizontal time scale 302. It is understood that the actual seek time can be different than shown and the X+2 and X+7 are examples only.

The coordination of the switching of the media at speed current 308 and the HAM seek current 310 can be performed by the control circuitry 138 of FIG. 1A. The control circuitry 138 can utilize the commutation logic 121 in the motor driver 120 to monitor the media speed 107 of FIG. 1A during the coasting of the media 104. The duration of the acceleration and deceleration of the head actuation motor 130 of FIG. 1A can be sufficiently short that the inertia of the media 104 can maintain the media speed 107 with no additional application of the motor drive current 116. If a significantly long acceleration of the head 102 is required, a reduced amount of the motor drive current 116 can be applied to the media motor 114 in order to keep the media speed 107 within operational limits for writing or reading the media 104. The determination of the media speed 107 and the application of a reduced amount or none of the motor drive current 116 is coordinated by the control circuitry 138.

The control circuitry 138 manage the media speed 107, through the control of the motor drive current 116, in order to provide the correct rotation rate of the media 104 for read or write operations that can follow the repositioning operation of the head 102. By way of an example, the media 104 will be maintained at a nominal value of the media speed 107 beyond the X+7 time mark, which indicates the end of the repositioning operation of the head 102.

It has been discovered that some embodiments can significantly reduce the operational maximum current 312 by coordinating the reduction of the media at speed current 308 and the HAM seek current 310. The reduction of the operational maximum current 312 can provide significant margin between the operational maximum current 312 and the specification current limit 306. The reduced current demand presented by the electronic system 100 can allow extended operational battery life in portable systems, reduced thermal and electrical requirements for fixed systems, and increased reliability due to a stable reduced demand on the power supply current 124 of FIG. 1A.

Figure 4:
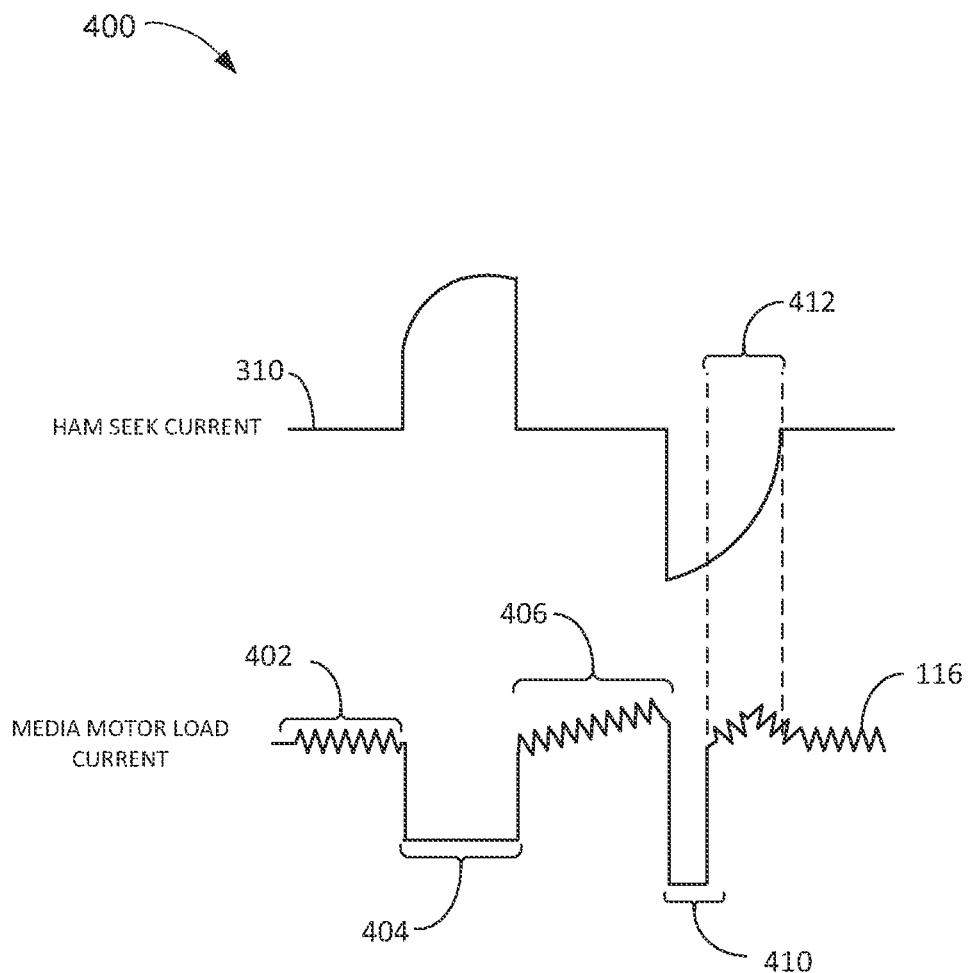
FIG. 4 is a plot of the primary current loads of the electronic system according to an embodiment.

Referring now to FIG. 4, therein is shown a plot 401 of the primary current loads of the electronic system 100 according to an embodiment. The plot 401 of the primary current loads of the electronic system depicts a HAM seek current 310 and the motor driver current 116. The HAM seek current 310 displays a characteristic current profile for the acceleration and deceleration of the head actuation motor 130 of FIG. 1A.

In a track following region 402, the head 102 of FIG. 1A can be in a track following mode and requires no acceleration. The control circuitry 138 of FIG. 1A can receive a command to relocate the head 102 to another location on the media 104 of FIG. 1A. The control circuitry 138 can coordinate the reduction of the motor drive current 116 in a head acceleration region 404, while asserting a rapid increase in the head actuation motor 130. The increase in the amplitude of the HAM seek current 310 is counteracted by the reduction in the motor drive current 116, resulting in the host power supply 124 providing the operational maximum current 312 that is much less that the specification current limit 306.

An embodiment can provide a motor pitch region 406, such as a region of increased speed of the media motor 114. The motor pitch region 406 can provide an increased speed of the media motor 114 in preparation for reducing the motor drive current 116 during a current harvesting region 410 or a harvesting recovery region 412. The motor pitch region 406 can increase the speed of the media motor 114 by a fixed percentage that allows the control circuitry 138 to maintain the reading of the servo sectors 122 of FIG. 1A throughout the coasting of the media motor 114.

The current harvesting region 410 can provide a current source for driving the head actuation motor 130 in an initial braking of the head actuation motor 130. The control circuitry 138 can utilize the current harvesting region 410 to coast the media motor 114 while applying the braking current to the head actuation motor 130. The control circuitry 138 can utilize the inertia of the media motor 114 to provide a current source for driving the head actuation motor 130 through the initial portion of the deceleration process in order to further reduce the operational maximum current 312 and reduce the overall current demand of the electronic system 100 of FIG. 1A. The inertia of the media motor 114 can provide a free-wheel current 116 back through the motor driver 120 of FIG. 1A, which can be harvested by the control circuitry 138 for driving the head actuation motor 130 in order to reduce the operational maximum current 312. The control circuitry 138 can utilize the commutation logic 121 of FIG. 1A for timing the harvesting of the free-wheel current 116 and monitoring the speed of the media motor 114 in the current harvesting region 410.

The control circuitry 138 can utilize the motor pitch region 406 to increase the inertia of the media 104 by increasing the media speed 107 in anticipation of the deceleration of the media motor 114 caused by the harvesting of the free-wheel current 116. Immediately after the harvesting recovery region 412, the media speed 107 can be within the operational limits of the electronic system 100 for performing writes or reads of the media 104. During the head acceleration region 404, the motor pitch region 406, the current harvesting region 410, and the harvesting recovery region 412, the control circuitry 138 can monitor the position of the head 102 and the approximate rotation rate of the media 104 through the monitoring of the servo sectors 122.

The control circuitry 138 can initiate the harvesting recovery region 412 as a function of the media speed 107, the distance to the destination track, a current threshold indicator, or a combination thereof. The control circuitry 138 can reengage the motor drive current 116 within the harvesting recovery region 412 in order to restore the nominal value of the media speed 107. Beyond the harvesting recovery region 412, the media speed 107 can be at the nominal value for immediate initiation of a write or read operation of the media 104. It is understood that additional rotational latency can be required in order to reach the starting location of the write or read operation on the destination track of the media 104. The rotational latency is not extended by the harvesting of the free-wheel current 116 by the control circuitry 138.

It is understood that the current harvesting region 410 is shown only on the deceleration portion of the HAM seek current 310 as an example and the current harvesting region 410 can be utilized during other operations as well. It is further understood that the control circuitry 138 can coordinate the timing of the reduction of the motor drive current 116 in the head acceleration region 404, increase the media speed 107 of FIG. 1A in the motor pitch region 406, and coordinate the harvesting of the free-wheel current 116 in the current harvesting region 410.

It has been discovered that the electronic system 100 can provide a dynamic power management process for reducing the operational maximum current 312 to be substantially less that the specification current limit 306. The reduction in the demand on the current from the host power supply 124 of FIG. 1A can translate to less expensive system power supplies, reduced heat generation, and a balance of current demand and seek performance. By reducing the motor drive current 116 prior to activating the HAM seek current 310, the control circuitry 138 can maintain the performance of the electronic system 100 while providing the operational maximum current substantially below the specification current limit 306.

It is understood that the media speed 107 can be at a nominal value after the harvesting recovery region 412. The nominal value of the media speed 107 can be sufficient for immediately reading the media 104 but insufficient for writing the media 104 or the nominal value of the media speed 107 can be sufficient for immediately reading or writing the media 104.

Figure 5:
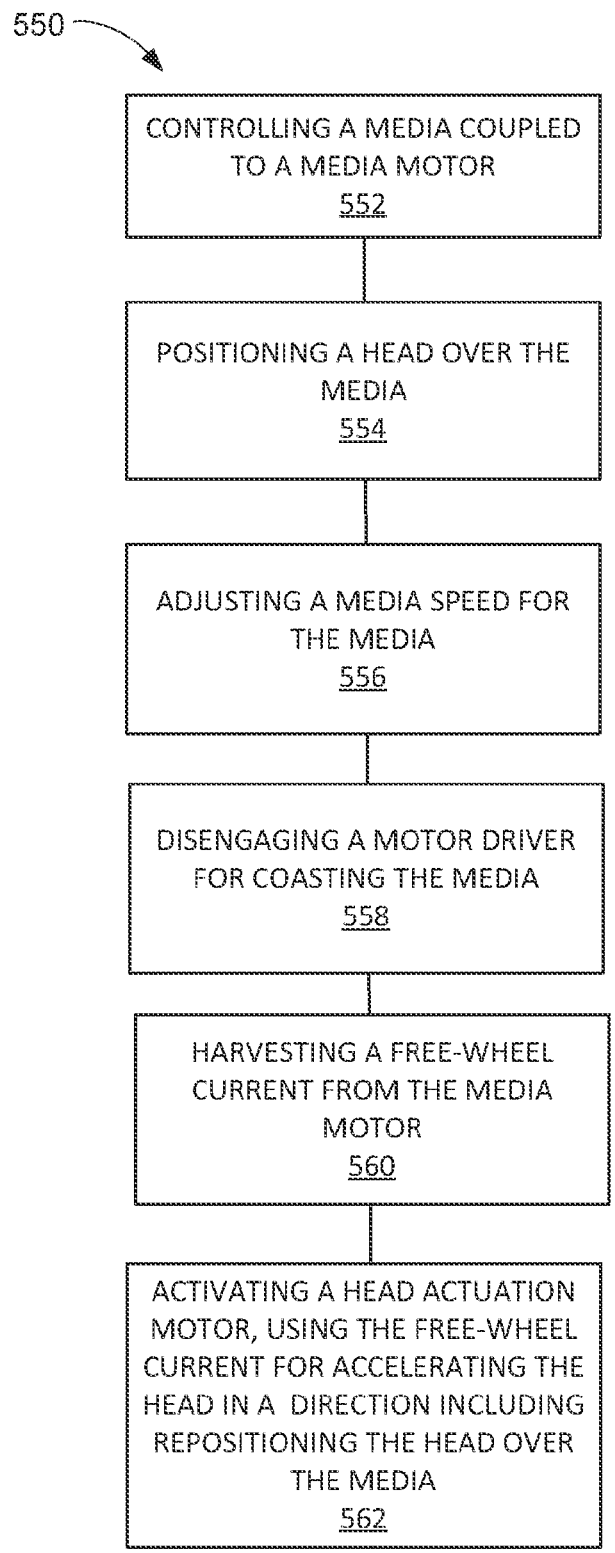
FIG. 5 is a flow chart of a method of operating an embodiment of the electronic system in a current harvesting mode of operation.

Referring now to FIG. 5, therein is shown a flow chart of a method 550 of operating an embodiment of the electronic system 100 in a current harvesting mode of operation. The flow chart of the method 550 depicts: controlling a media coupled to a media motor in a block 552; positioning a head over the media in a block 554; adjusting a media speed for the media in a block 556; disengaging a motor driver for coasting the media in a block 558; harvesting a free-wheel current from the media motor in a block 560; and activating a head actuation motor, using the free-wheel current, for accelerating the head in a first direction including repositioning the head over the media in a block 562.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment is that it valuably supports and services the historical trend of reducing costs, simplifying systems, and increasing performance.

These and other valuable aspects of an embodiment consequently further the state of the technology to at least the next level.

While the embodiments have been described in conjunction with a specific detailed description, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An apparatus comprising:
   a media motor;
   a media mounted on the media motor;
   a head, over the media, the motion of the head being controlled by a head actuation motor;
   a motor driver, coupled to the media motor, configured to adjust a media speed; and
   control circuitry configured to:
      coast the media motor in preparation for accelerating the head,
      activate the head actuation motor including accelerating the head in a first direction for repositioning the head over the media,
      increase a speed of the media motor by a fixed percentage in a motor pitch region after accelerating the head, and
      coast the media motor in preparation for decelerating the head.

2. The apparatus as claimed in claim 1 wherein the motor driver configured to reduce a motor driver current for coasting the media motor.

3. The apparatus as claimed in claim 1 wherein the head actuation motor receives an acceleration current for accelerating the head in the first direction.

4. The apparatus as claimed in claim 1 wherein the control circuitry is further configured to cause the motor driver to monitor the media speed of the media motor with the motor current reduced.

5. The apparatus as claimed in claim 1 wherein the control circuitry is further configured to cause the motor driver to activate a commutation of the media motor when the head has a constant velocity.

6. The apparatus as claimed in claim 1 wherein the control circuitry is further configured to cause the motor driver to increase the media speed prior to the decelerating of the head in the first direction.

7. The apparatus as claimed in claim 1 wherein the control circuitry is further configured to cause the head to accelerate in a direction opposite the first direction.

8. The apparatus as claimed in claim 1 wherein the control circuitry is further configured to coast the media motor in preparation for accelerating the head in a direction opposite the first direction.

9. The apparatus as claimed in claim 1 wherein the control circuitry is further configured to coordinate the media motor and the head actuation motor for reducing a peak current.

10. The apparatus as claimed in claim 1 wherein the control circuitry is further configured to detect a deceleration window of the head actuation motor and activate the motor driver for recovering a media speed within a seek settle window.

11. A method of operating an apparatus, the method comprising:
    controlling a media motor having a media attached;
    positioning a head over a media;
    adjusting a media speed for the media;
    disengaging a motor driver for coasting the media;
    activating a head actuation motor, with the media coasting, for accelerating the head in a first direction including repositioning the head over the media;
    reengaging the motor driver for increasing the media speed of the media by a fixed percentage in a motor pitch region after accelerating the head; and
    coasting the media motor again in preparation for decelerating the head.

12. The method as claimed in claim 11 wherein adjusting the media speed includes maintaining a constant speed.

13. The method as claimed in claim 11 wherein increasing the media speed includes ramping to a pitch speed.

14. The method as claimed in claim 11 wherein activating the head actuation motor with the media coasting includes dropping a motor driver current of the motor driver to zero while increasing an acceleration current of the head actuation motor.

15. The method as claimed in claim 11 further comprising activating the motor driver for commutating the media motor when the head has a constant velocity.

16. The method as claimed in claim 11 wherein activating the head actuation motor includes increasing an acceleration current, for accelerating the head in the first direction, with a motor drive current reduced.

17. The method as claimed in claim 11 wherein activating the head actuation motor includes increasing an acceleration current, for accelerating the head in a direction opposite the first direction, with a motor drive current removed.

18. The method as claimed in claim 11 wherein disengaging the motor driver for coasting the media includes decreasing the media speed to within a range that corresponds to the head's capability to read servo data.

19. The method as claimed in claim 11 wherein disengaging the motor driver for coasting the media includes coordinating the media motor and the head actuation motor for reducing a peak current.

20. The method as claimed in claim 11 further comprising detecting a deceleration window of the head actuation motor including recovering the media speed within a seek settle window.

21. A method of operating an apparatus, the method comprising:
    controlling a media coupled to a media motor;
    positioning a head over the media;
    adjusting a media speed for the media;
    disengaging a motor driver for coasting the media;
    harvesting a free-wheel current from inertia of the media motor;
    activating a head actuation motor, using the free-wheel current, for accelerating the head in a direction including repositioning the head over the media;
    reengaging the motor driver for increasing the media speed of the media motor by a fixed percentage in a motor pitch region after acceleration the head; and
    coasting the media motor again in preparation for decelerating the head.

22. The method as claimed in claim 21 wherein adjusting the media speed includes increasing the media speed in the motor pitch region, decelerating the media motor during the harvesting of the free-wheel current, and returning the media speed to a nominal value after decelerating the head.

* * * * *